United States Patent
Xie et al.

(10) Patent No.: US 9,406,449 B2
(45) Date of Patent: Aug. 2, 2016

(54) SUPERCAPACITOR DEVICES FORMED BY DEPOSITING METAL OXIDE MATERIALS ONTO CARBON SUBSTRATES

(71) Applicants: The Regents of the University of Colorado, a Body Corporate, Denver, CO (US); Rensselaer Polytechnic Institute, Troy, NY (US)

(72) Inventors: Ming Xie, Broomfield, CO (US); Steven M. George, Boulder, CO (US); Mattias J. Young, Boulder, CO (US); Xiang Sun, Kalamazoo, MI (US); Jie Lian, Niskayuna, NY (US); Gongkai Wang, Troy, NY (US)

(73) Assignee: Regents of the University of Colorado, a Body Corporate, Denver, CO (US)

( * ) Notice: Subject to any disclaimer, the term of this patent is extended or adjusted under 35 U.S.C. 154(b) by 0 days.

(21) Appl. No.: 14/357,566

(22) PCT Filed: Nov. 9, 2012

(86) PCT No.: PCT/US2012/064261
§ 371 (c)(1),
(2) Date: May 10, 2014

(87) PCT Pub. No.: WO2013/070989
PCT Pub. Date: May 16, 2013

(65) Prior Publication Data
US 2014/0340818 A1  Nov. 20, 2014

Related U.S. Application Data

(60) Provisional application No. 61/558,182, filed on Nov. 10, 2011, provisional application No. 61/558,187, filed on Nov. 10, 2011.

(51) Int. Cl.
*H01G 9/00* (2006.01)
*H01G 11/36* (2013.01)
*H01G 11/30* (2013.01)
*H01G 11/32* (2013.01)
*H01G 11/46* (2013.01)
(Continued)

(52) U.S. Cl.
CPC ............... *H01G 11/36* (2013.01); *H01G 11/04* (2013.01); *H01G 11/26* (2013.01); *H01G 11/30* (2013.01); *H01G 11/32* (2013.01); *H01G 11/46* (2013.01); *Y02E 60/13* (2013.01)

(58) Field of Classification Search
CPC ........... H01G 9/00; H01G 9/04; H01G 5/015; H01G 11/22
USPC ......... 361/502, 503–504, 509–512, 516–519, 361/523–525
See application file for complete search history.

(56) References Cited

U.S. PATENT DOCUMENTS

| | | | |
|---|---|---|---|
| 6,031,711 A * | 2/2000 | Tennent | B82Y 30/00 361/301.5 |
| 6,205,016 B1 * | 3/2001 | Niu | H01G 9/155 204/280 |

(Continued)

FOREIGN PATENT DOCUMENTS

WO  WO 2009/022351 A1  2/2009  ............. H01M 4/50

OTHER PUBLICATIONS

Meng, Xiango, et al. "Controllable synthesis of graphene-based titanium dioxide nanocomposites by atomic layer deposition," *Nanotechnology, IOP*, 22(16): 165602 (Mar. 11, 2011).

*Primary Examiner* — Nguyen T Ha
(74) *Attorney, Agent, or Firm* — Arendt & Associates IP Group; Jacqueline Arendt (57) ABSTRACT

Supercapacitors have composite electrodes that include a porous carbonaceous material such as graphene onto which a metal oxide pseudocapacitor material is deposited in the form of nano-scale particles or a nano-scale film. The composite electrodes exhibit excellent specific capacitance, even at high scan rates.

22 Claims, 6 Drawing Sheets

(51) Int. Cl.
*H01G 11/04* (2013.01)
*H01G 11/26* (2013.01)

(56) References Cited

U.S. PATENT DOCUMENTS

| | | | |
|---|---|---|---|
| 6,517,972 B1 * | 2/2003 | Amatucci | H01G 9/155 361/503 |
| 7,079,377 B2 * | 7/2006 | Schott | H01G 9/008 361/503 |
| 8,021,524 B2 * | 9/2011 | Suh | B82Y 30/00 204/242 |
| 8,427,812 B1 * | 4/2013 | Stenger-Smith | C07D 333/22 361/502 |
| 2009/0185327 A1 | 7/2009 | Seymour | 361/500 |
| 2011/0038100 A1 | 2/2011 | Lu et al. | 361/502 |

\* cited by examiner

SUPERCAPACITOR DEVICES FORMED BY DEPOSITING METAL OXIDE MATERIALS ONTO CARBON SUBSTRATES

CROSS-REFERENCES TO RELATED APPLICATIONS

The present application is the national phase of International Application No. PCT/US12/64261, filed Nov. 9, 2012. This application claims priority to U.S. Provisional Patent Application Nos. 61/558,182 and 61/558,187, both filed on Nov. 10, 2011.

STATEMENT REGARDING FEDERALLY SPONSORED RESEARCH OR DEVELOPMENT

This invention was made with Government support under contract FA9451-12-1-0229 awarded by the U.S. Air Force Research Laboratory. The Government has certain rights in the invention.

BACKGROUND OF THE INVENTION

This invention relates to supercapacitor devices.

Supercapacitors, also known as ultracapacitors, are energy storage devices characterized in having very high capacitance (and therefore energy density) compared with conventional capacitors, and very high power densities compared with batteries. Due to their high capacitance and high power, supercapacitors can be effective energy storage and power supply devices for a wide variety of applications. These applications include a range of consumer electronics, wireless communication devices, electric vehicles and fuel cell vehicles. Supercapacitors are especially useful in applications in which rapid energy release and/or rapid energy capture are needed. Thus, supercapacitors are used to boost acceleration and capture braking energy in electric or hybrid vehicles.

Supercapacitors can be classified as electric double layer capacitors (EDLCs), pseudocapacitors and hybrid types. The EDLCs store charge electrostatically, or "non-Faradaically", without a transfer of charge between the electrode and electrolyte. The electrodes in EDLC types are very high surface area carbon electrodes, which can be fabricated from, for example, activated carbon, carbon nanotubes, carbon aerogels, carbon nanofibers, graphene and various composites containing one or more of those materials. The capacitance of these materials is highly dependent on their surface area.

EDLCs generally have high power densities but low energy densities. Pseudocapacitors, on the other hand, potentially have much higher energy densities than the EDLCs, at the cost of some power density. Each of these phenomena relates to the Faradaic mechanism by which pseudocapacitors store and release energy. Among the materials that have been proposed as pseudocapacitors are various transition metal oxides (such as $V_2O_5$, $RuO_2$, $MnO_2$, $TiO_2$ and NiO), $Ni(OH)_2$, other transition metal compounds such as $TiS_2$ and $BeTe_3$, and certain other metal oxides such as $SnO_2$. Unlike the EDLCs, pseudocapacitors store and release energy through the transfer of charge between the electrode surface and the electrolyte. This charge transfer mechanism is slower than the physical charge storage mechanism of the EDLCs, which results in lower power densities. The pseudocapacitor materials tend to have high electrical resistivity, which is detrimental for high-power capacitance and cycling performance. In addition, high energy densities can only be obtained when the pseudocapacitor material has been fabricated with a very high surface area, which is difficult to do in practice. As a result, attempts have been made to form nanocomposites in which the pseudocapacitor material is dispersed into or coated onto a more conductive, high surface area substrate.

Hybrid supercapacitors have been proposed as a way to overcome the problem of producing high surface area pseudocapacitors, and to try to combine the high power density of an EDLC with the high energy density of a pseudocapacitor. In one approach, nanoparticles or nanocoatings of a pseudocapacitor material are applied to a high surface area carbon substrate. The carbon substrate provides capacitance via a non-Faradaic process, and also provides a conductive substrate for the pseudocapacitor particles. See, e.g., Wang et al., Dalton Trans., 2011, 40, 6388 ($CeO_2$ nanoparticles on a graphene substrate) and Ghosh et al., Adv. Funct. Mater. 2011, 21, 2541-2547 (3-18 nm $V_2O_5$ coatings on a carbon-nanofiber paper).

Atomic layer deposition (ALD) is a thin film deposition technique that is capable of depositing conformal thin films on high-aspect-ratio substrates and nanoparticles, among other substrates. ALD processes permit close control over film thickness, and in most cases produces a film that is chemically bonded to the substrate. ALD techniques have been used to produce a $TiO_2$-graphene composite. See Meng et al., "Controllable synthesis of graphene-based titanium dioxide nanocomposites by atomic layer deposition", Nanotechnology 22 (2011) 165602. Meng et al. found that the structure of the applied titanium dioxide varied with the deposition temperature and with the amount of titanium dioxide that was applied (which is expressed in terms of the number of reaction cycles that were performed). The titanium dioxide at first forms 2-3 nm particles. As more reaction cycles are performed, the particles grow and eventually form a continuous film. Lower deposition temperatures (150-200° C.) tended to produce an amorphous film, whereas higher deposition temperatures (200-250° C.) produced anatase material. Meng does not describe any electrochemical testing of the composite.

SUMMARY OF THE INVENTION

This invention is a supercapacitor comprising at least two electrodes, each electrode being in electrical contact with an electrically conductive current collector, said electrodes being spaced apart and having an electrolyte interposed between and in contact with each of said electrodes, wherein at least one of the electrodes is a composite of a porous carbonaceous material having a metal oxide pseudocapacitor material deposited thereon via an atomic layer deposition process and chemically bonded to the carbonaceous material, the oxide pseudocapacitor material being in the form of 0.5 to 20 nm particles or a film having a thickness of from 0.5 to 25 nm and constituting 25 to 95% of the weight of the composite, and wherein the composite has a surface area of at least 25 $m^2/g$.

In specific embodiments, this invention is a supercapacitor comprising at least two electrodes, each electrode being in electrical contact with an electrically conductive current collector, said electrodes being spaced apart and having an electrolyte interposed between and in contact with each of said electrodes, wherein at least one of the electrodes is a composite of a porous carbonaceous material having 0.1 to 20 nm particles or a 0.1 to 20 nm film of a first metal oxide deposited onto and chemically bonded to the carbonaceous material directly or through an intermediate functionalizing layer, and a metal oxide pseudocapacitor material different than the first metal oxide and deposited onto the particles or film of the first metal oxide and chemically bonded thereto, the metal oxide pseudocapacitor material being in the form of 0.5 to 20 nm particles or a film having a thickness of 0.5 to 25 nm and constituting 25 to 95% of the weight of the composite, and wherein the composite has a surface area of at least 25 m$^2$/g.

It is preferred that all of the electrodes of the supercapacitor are formed from a composite as described herein.

Supercapacitors of the invention have been found to have excellent specific capacitance, even at high scanning rates.

DETAILED DESCRIPTION OF THE INVENTION

Figure 1:
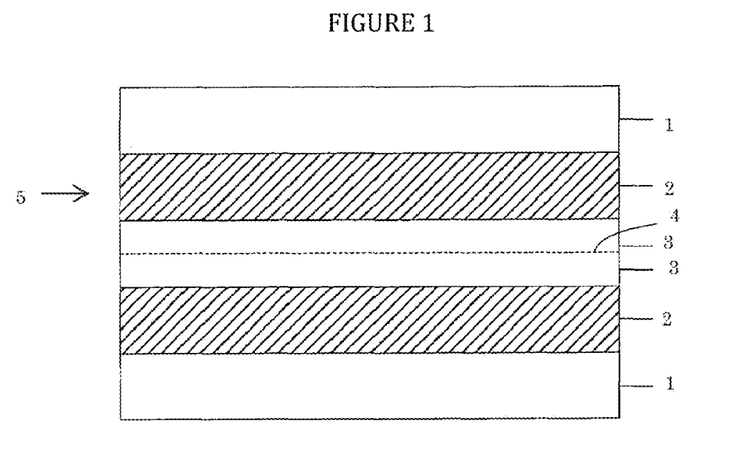
FIG. 1 is a cross-sectional schematic of a supercapacitor of the invention.

FIG. 1 is a cross-sectional view of an embodiment of a supercapacitor 5 of the invention. Electrodes 2 are each in electrical contact with an adjacent current collector 1. Current collectors 1 each are typically in electrical connection with an electrical circuit (not shown). The electrical circuit applies a potential across supercapacitor 5 during a charging cycle, leading to the storage of energy, and energy is released into the electrical circuit during a discharge cycle. Electrodes 2 are spaced apart from one another, and electrolyte 3 is interposed between electrodes 2 and in contact with each of electrodes 2. In the embodiment shown, separator 4 is interposed between electrodes 2. Separator 4 serves to prevent electrodes 2 from coming into contact with each other and thus prevents short-circuiting. Separator 4 may be omitted if electrodes 2 are otherwise constrained from coming into electrical contact with each other.

Although the embodiment shown in FIG. 1 includes only two electrodes and current collectors, it is possible to include any higher number of electrodes in a specific supercapacitor design, each in electrical contact with a current collector, each being spaced apart from each adjacent electrode and having an electrolyte interposed between and in contact with each adjacent pair of electrodes. If needed, separators are also interposed between each adjacent pair of electrodes. Specific supercapacitor designs include various stacked and spiral-wound designs, as are well-known.

Current collectors 1 are made of a conductive material such as a metal. Among the metals, aluminum, nickel, cobalt, iron, copper, gold, platinum and the like are all suitable.

Electrolyte 3 is a material that provides a charge reservoir for the supercapacitor. The electrolyte can be a solid or a fluid. If the electrolyte is a fluid, the electrolyte enters the pores of the electrode material and provides ionic charge carriers for charge storage.

Fluid electrolytes in supercapacitors may be aqueous electrolyte solutions, organic electrolyte solution, or ionic liquids. Examples of aqueous electrolyte solutions include aqueous sulfuric acid, potassium hydroxide and sodium hydroxide solutions.

Organic electrolyte solutions are generally preferred when operating voltages are expected to exceed about one volt. Organic electrolyte solutions include one or more organic solvents in which are dissolved one or more salts. The organic solvent may include, for example, one or more linear alkyl carbonates, cyclic carbonates, cyclic esters, linear esters, cyclic ethers, alkyl ethers, nitriles, sulfones, sulfolanes, siloxanes and sultones. Mixtures of any two or more of the foregoing types can be used. Cyclic esters, linear alkyl carbonates, and cyclic carbonates are preferred types of nonaqueous solvents. Suitable linear alkyl carbonates include dimethyl carbonate, diethyl carbonate, methyl ethyl carbonate and the like. Cyclic carbonates that are suitable include ethylene carbonate, propylene carbonate, butylene carbonate and the like. Suitable cyclic esters include, for example, γ-butyrolactone and γ-valerolactone.

The dissolved salt in an organic electrolyte may be, for example, a quaternary ammonium salt such as a tetraalkylammonium salt, any of various alkali metal salts, sulfuric acid, potassium hydroxide, sodium hydroxide and the like.

Polymer gel electrolytes are also useful. Examples of such electrolytes include polyurethane-LiCF$_3$SO$_3$, polyurethane-lithium perchlorate, polyvinylacohol-KOH—H$_2$O, poly(acrylonitrile)-lithium salts, poly(acrylonitrile)-quaternary ammonium salts, and poly(ethylene oxide)-grafted poly(methyl)-methacrylate-quaternary ammonium salts. Additionally, other compounds such as ethylene carbonate and propylene carbonate can also be incorporated into the polymer matrix.

The separator is conveniently constructed from a nonconductive material. It should not be reactive with or soluble in the electrolyte solution or any of the components of the electrolyte solution under operating conditions. Polymeric separators are generally suitable. Examples of suitable polymers for forming the separator include polyethylene, polypropylene, polybutene-1, poly-3-methylpentene, ethylene-propylene copolymers, polytetrafluoroethylene, polystyrene, polymethylmethacrylate, polydimethylsiloxane, polyethersulfones and the like.

The electrolyte solution must be able to permeate through the separator. For this reason, the separator is generally porous, being in the form of a porous sheet, nonwoven or woven fabric or the like. The porosity of the separator is generally 20% or higher, up to as high as 90%. A preferred porosity is from 30 to 75%. The pores are generally no larger than 0.5 microns, and preferably up to 0.05 microns in their longest dimension. The separator is typically at least one micron thick, and may be up to 50 microns thick. A preferred thickness is from 5 to 30 microns.

At least one of the electrodes of the supercapacitor is a composite of a porous carbonaceous material having metal oxide pseudocapacitor material deposited thereon and chemically bonded thereto. The metal oxide pseudocapacitor materials is in the form of 0.5-20 nm particles or a film having a thickness of from 0.5 to 25 nm and constituting 25 to 95% of the weight of the composite. The composite has a surface area of at least 25 m$^2$/g.

In certain embodiments, at least one of the electrodes of the supercapacitor is a composite of a porous carbonaceous material having a first metal oxide deposited thereon in the form of 0.1 to 20 nm particles or a 0.1 to 20 nm film that is chemically bonded to the carbonaceous material directly or through an intermediate functionalizing layer, and a metal oxide pseudocapacitor material deposited onto the first metal oxide and chemically bonded thereto. The metal oxide pseudocapacitor in such embodiments is in the form of 0.5 to 20 nm particles or a film having a thickness of from 0.5 to 25 nm and constituting 25 to 95% of the weight of the composite. The composite of such embodiments has a surface area of at least 25 m$^2$/g. Such an electrode is illustrated schematically in FIG. 9.

Figure 9:
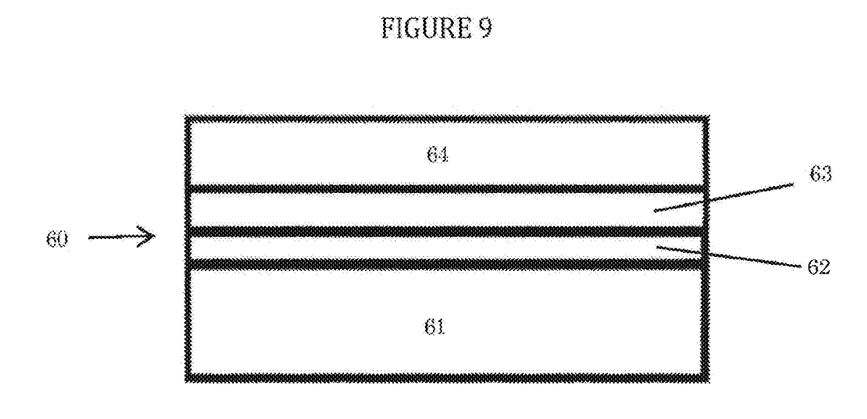
FIG. 9 is a cross-sectional view of a composite electrode of a supercapacitor of the invention.

In FIG. 9, electrode 60 includes porous carbonaceous material 61 which for purposes of simplification is illustrated in FIG. 9 a planar section without the pores. A first metal oxide layer 63 is deposited onto a surface of porous carbonaceous material 61. In the embodiment shown, layer 63 is chemically bonded to carbonaceous material 61 through an intermediate functionalizing layer 62. Metal oxide pseudocapacitor material 64 is deposited onto first metal oxide layer 63 and chemically bonded thereto.

The carbonaceous material may be, for example, activated carbon, carbon black, graphene, mesoporous carbon, carbon fibers, porous graphite, graphitized carbon, graphite powder, oriented pyrolytic graphite, glassy carbon, carbon aerogel, single wall carbon nanotubes, multi-wall carbon nanotubes, and the like. The carbonaceous material may be or include a polymer that has been carbonized by exposure to high temperature in a non-oxidizing atmosphere. Examples of polymers that can be carbonized in such a manner include, for example, polyacrylonitrile, phenolic resins, phenol formaldehyde resins, polyacenaphthalene, polyacrylether, polyvinylchloride, polyvinylidene chloride, poly(p-phenylene terephthalamide), poly-L-lactide, various polyimides, polyurethanes, nylons, polyacrylonitrile copolymers, such as poly (acrylonitrile-methyl acrylate), poly(acrylonitrile-methyl methacrylate), poly(acrylonitrile-itaconic acid-methyl acrylate), poly(acrylonitrile-vinyl pyridine), poly(acrylonitrile-vinyl chloride) and poly(acrylonitrile-vinyl acetate).

The carbonaceous material is porous. It may be in the form of, for example, a foam, woven, non-woven, matted or entangled fibers, compressed fine powders (including compressed nanofibers, nanotubes, exfoliated layered materials, and the like. The carbonaceous material may have, for example, a surface area of at least 50 m$^2$/g, as measured by nitrogen adsorption/desorption isotherm methods (such as the BET adsorption method), prior to the deposition of the metal oxide layer(s). It preferably has a surface area of at least 100 m$^2$/g, preferably at least 250 m$^2$/g. The carbonaceous material may have a surface area of up to about 2600 m$^2$/g (the theoretical surface area of fully exfoliated graphene), but practically will typically not exceed about 1500 m$^2$/g or 1000 m$^2$/g.

The metal oxide pseudocapacitor material may be any metal oxide that exhibits pseudocapacitance. The metal oxide pseudocapacitor material may be, for example, an oxide of a Group 3, 4, 5, 6, 7, 8, 9, 10, 11, or 12 metal or tin. The metal oxide of this pseudocapacitor in some embodiments is a transition metal oxide or tin oxide. The metal in some embodiments is a member of the fourth row of the periodic table of the elements. Oxides of fifth and sixth row metals can be used, but these are much heavier and so specific capacitances are significantly lower when oxides of these metals are used. The metal oxide pseudocapacitor material in some embodiments takes the form MO$_z$, where M denotes a metal having a valence state y and z is ≥y/2. Examples of specific metal oxides include, for example, vanadium, chromium, molybdenum, titanium, ruthenium, tin, manganese, nickel, cobalt, iron and copper oxides. Complex oxides of two or more transition metals, such as nickel-cobalt oxides, also are useful.

The metal oxide pseudocapacitor material is present in the form of 0.5 to 20 nm, preferably 1 to 20 nm particles, or a film having a thickness of 0.5 to 25 nm, preferably 1 to 25 nm. If in the form of particles, the particles more preferably are 1 to 10 nm particles, especially 3 to 10 nm particles. If in the form of a film, the film preferably has a thickness of from 2 to 20 nm, especially from 2 to 12 nm.

The deposited particles or film of the metal oxide pseudocapacitor material constitutes 25 to 95% of the weight of the composite. A more typical amount is from 50 to 75% of the weight of the composite.

The first metal oxide, when present, is deposited on the carbonaceous material in the form of 0.1 to 20 nm particles, preferably 0.2 nm particles, or a film having a thickness of 0.1 to 20 nm, preferably 0.2 to 5 nm, and more preferably 0.25 to 1 nm. This layer is preferably a film. The film preferably is continuous and conformal. The first metal oxide preferably is one that can be deposited via an atomic layer deposition process as described below. The first metal oxide is different from the metal oxide pseudocapacitor material and may or may not be a pseudocapactor material itself. The first metal oxide preferably is a Group 2, 3, 12, 13, 14 or 15 metal oxide. The metal may be, for example, Be, Mg, Ca, Sr, Ba, Sc, Y, La, Zn, Cd, Hg, Al, Ga, In, Ge, Sn, Pb, Sb or Bi. Oxides of those metals having atomic weights of 32 or less are preferred, because heavier metals increase the weight of the electrode significantly and thus reduce the specific capacitance. In some embodiments, this oxide will typically take the form M$^1$O$_z$, where M$^1$ denotes a Group 2, 3, 12, 13, 14 or 15 metal having a valence state y and z is ≥y/2. Aluminum is the most preferred metal.

The first metal oxide may be deposited and chemically bonded directly onto the carbonaceous material, or through an intermediate functionalizing layer. In some cases, the carbonaceous material itself may lack enough reactive groups at its surface to bond to the first metal oxide. Graphene, for example, consists of exfoliated sheets that often have reactive groups at their edges, or at defects, but lack reactive groups on the planar surfaces. The lack of reactive groups can result in an irregular or in complete deposition or bonding of the first metal oxide layer. In cases such as these, an intermediate functionalizing layer may be deposited between the carbonaceous material and the first metal oxide layer. The intermediate functionalizing layer can be understood as a tie layer and/or simply as a layer of functional groups introduced onto the surface of the carbonaceous material. The intermediate functionalizing layer forms chemical bonds to the carbonaceous material and to the first metal oxide layer.

The intermediate functionalizing layer, therefore, may be as little as a mono-atomic layer having a thickness of as little as 0.05 nm. It may be as thick as 20 nm, but preferably is no thicker than 5 nm and still more preferably no thicker than 1 nm or no thicker than 0.5 nm.

Figure 2:
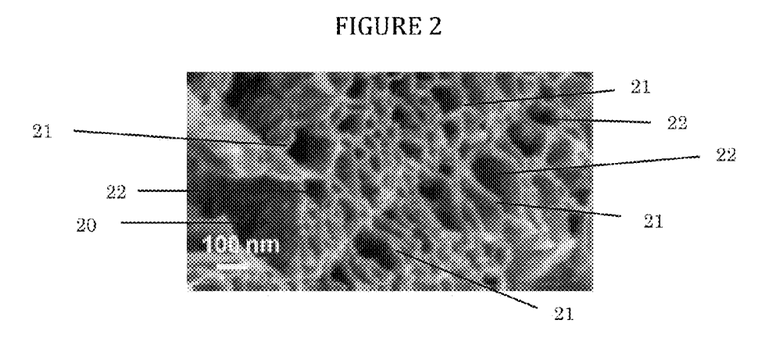
FIG. 2 is a micrograph of a composite electrode in accordance with the invention.
Figure 2A:
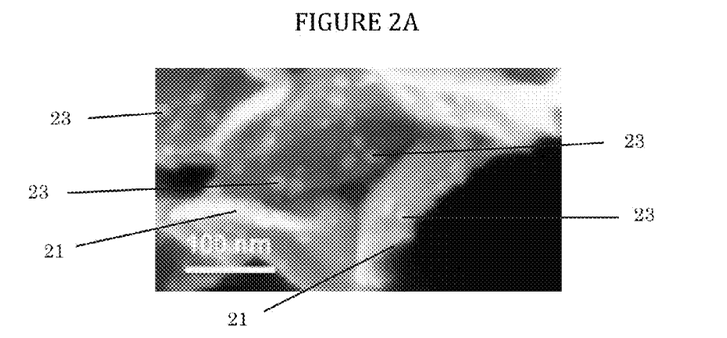
FIG. 2A is a micrograph of a composite electrode in accordance with the invention.

The composite has a surface area of at least 25 m²/g, as measured by nitrogen adsorption/desorption isotherm methods (such as the BET adsorption method). Surface areas per gram are generally much lower for the composite than for the starting carbonaceous material, due to the added weight of the metal oxide pseudocapacitor material. Therefore, the composite surface area typically does not exceed 200 m²/g and more typically is from 25 to 100 m²/g. However, pore sizes and pore volumes tend to be changed little from those of the starting carbonaceous material. The composite typically has open and interconnected pores that are typical of the starting carbonaceous material. FIGS. 2 and 2A are illustrative. In FIG. 2, composite 20 includes partially exfoliated graphene sheets 21 containing pores 22. The metal oxide pseudocapacitor material in FIGS. 2 and 2A is deposited in the form of 3 to 15 nm particles 23, as can be seen in the higher magnification view of FIG. 2A.

The particles or film of the metal oxide pseudocapacitor material is deposited via an atomic layer deposition process. In the atomic layer deposition process, a layer is deposited in the reaction of two or more gas phase reactants. The gas phase reactants are separately and alternatingly contacted with the carbonaceous material. The gas phase reactants are not capable of reacting with themselves under the conditions of the process. Each reactant reacts at the surface of the substrate, each in turn forming a mono-layer of deposited material. Excess amounts of reactant are removed before introducing the next reactant. Reaction by-products are removed as well, between successive introductions of the reagents. This procedure ensures that reactions occur at the surface of the substrate, rather than in the gas phase.

A purge gas is typically introduced between the alternating feeds of the reactants, in order to further help to remove excess reactants. A carrier gas, which is usually but not necessarily the same as the purge gas, generally (but not always necessarily), is introduced during the time each reactant is introduced. The carrier gas may perform several functions, including (1) facilitating the removal of excess reactant and reaction by-products, (2) distributing the reactant through the reaction zone, thereby helping to expose all substrate surfaces to the reactant and (3) in the case of applying the coating to the electrode particles, fluidizing a particulate substrate so that all particle surfaces become exposed to the reactant. The purge gas does not react undesirably with the ALD reactants or the deposited coating, or interfere with their reaction with each other at the surface of the metal particles.

A typical pattern of introducing reactants (in a two-reagent ALD reaction scheme) is:

1. Optionally, introduce purge/fluidizing gas.
2. Introduce the first reagent or a mixture of carrier gas and the first reagent.
3. Introduce purge/fluidizing gas and/or pull a high vacuum to remove excess quantities of the first reagent as well as reaction by-products.
4. Introduce the second reagent or a mixture of carrier gas and the second reagent.
5. Introduce purge/fluidizing gas and/or pull a high vacuum to remove excess quantities of the second reagent and reaction by-products.
6. Repeat steps 2-5 until the desired coating thickness is obtained. This process is adaptable to include any number of reagents within a single reaction cycle.

Reaction conditions are selected mainly to meet two criteria. The first criterion is that the reagents are gaseous under the conditions of the reaction. Therefore, temperature and pressure conditions are selected such that the reactants are volatilized. The second criterion is one of reactivity. Conditions, particularly temperature, are selected such that the desired reaction between the gas-phase reagents (or, at the start of the reaction, the first-introduced reagent and the particle surface) occurs at a commercially reasonable rate.

The temperature of the reactions may range from 250 to 1000K, but is preferably no greater than 500K. A preferred temperature range is from 273 to 473K. The substrate should be thermally stable at the temperatures used to deposit the film; hence, in some cases the operating temperature may be selected in conjunction with the particular substrate.

Subatmospheric pressures will normally be required.

The progress of the reaction can be monitored using techniques such as Fourier transform infrared spectroscopy, Auger electron spectroscopy, quartz crystal microbalance methods and mass spectrometry.

Such atomic layer deposition techniques permit the formation of deposits of up to about 0.01 to 0.6 nm in thickness per reaction cycle, and thus provide a means of extremely fine control over deposit thickness. The reactions are self-limited and can be repeated to sequentially deposit additional layers of the deposited material until a desired thickness is achieved.

During the first few reaction cycles, one or the other of the reagents will react with functional groups on the surface of the carbonaceous material to form a chemical bond to the carbonaceous material. Certain carbonaceous materials (such as graphene, single-wall carbon nanotubes and multiple wall carbon nanotubes) will contact reactive sites only at plate boundaries or at defects. For this reason, it may be desirable to introduce an intermediate functionalizing layer onto the carbonaceous material prior to depositing the first metal oxide. One method of accomplishing this is to introduce surface reactive groups by performing one or more ALD cycles using $NO_2$ and a Group 2, 3, 12, 13, 14 or 15 metal-containing precursor as the reagents. This process is capable of introducing reactive nitrite groups onto the surface of a carbonaceous substrate, upon which the first metal oxide can be deposited. A suitable such process, using $NO_2$ and an aluminum precursor, is generally described by Farmer et al., "Atomic layer deposition on suspended single-walled carbon nanotubes via gas-phase non-covalent functionalization", *Nano Letters* 2006 (6) 699-703, incorporated herein by reference.

The deposition of the first metal oxide and the metal oxide pseudocapacitor materials each can be performed using a binary (AB) reaction sequence as follows. The asterisk (*) indicates the atom that resides at the surface of the particle or coating, and Z represents oxygen or nitrogen. $M^1$ is an atom of the metal and X is a displaceable nucleophilic group. The reactions shown below are not balanced, and are only intended to show the surface reactions (i.e., not inter- or intralayer reactions).

$$\text{Surface-Z—H}^* + M^1X_n \rightarrow M\text{-Z-}M^1X^* + HX \quad (A1)$$

$$\text{Surface-Z-}M^1X^* + H_2O \rightarrow M\text{-Z-}M^1OH^* + HX \quad (B1)$$

In reaction A1, reagent $M^1X_n$ reacts with one or more surface*-Z—H groups at the surface to create a new surface group having the form -$M^1$-X. $M^1$ is bonded to the surface of the carbonaceous material through one or more Z atoms. The -$M^1$-X group represents a site that can react with water in reaction B1 to regenerate one or more hydroxyl groups. The hydroxyl groups formed in reaction B1 can serve as functional groups through which reactions A1 and B1 can be repeated, each time adding a new layer of $M^1$ atoms. Note that in some cases hydroxyl groups can be eliminated as water, forming $M^1$-O-$M^1$ bonds within or between layers. This condensation reaction can be promoted if desired by, for example, annealing at elevated temperatures and/or reduced pressures.

Binary reactions of the general type described by equations A1 and B1 are described more fully in J. W. Klaus et al, "Atomic Layer Controlled Growth of $SiO_2$ Films Using Binary Reaction Sequence Chemistry", *Appl. Phys. Lett.* 70, 1092 (1997) and O. Sheh et al., "Atomic Layer Growth of $SiO_2$ on Si(100) and $H_2O$ using a Binary Reaction Sequence", *Surface Science* 334, 135 (1995), A. C. Dillon et al, "Surface Chemistry of $Al_2O_3$ Deposition using $Al(CH_3)_3$ and $H_2O$ in a Binary reaction Sequence", *Surface Science* 322, 230 (1995), A. W. Ott et al., "$Al_2O_3$ Thin Film Growth on Si(100) Using Binary Reaction Sequence Chemistry", *Thin Solid Films* 292, 135 (1997), Meng et al., "Controllable synthesis of graphene-based titanium dioxide nanocomposites by atomic layer deposition", *Nanotechnology* 22 (2011) 165602, Tsapatsis et al. (1991) *Ind. Eng. Chem. Res.* 30:2152-2159 and Lin et al., (1992), *AIChE Journal* 38:445-454.

The result of the atomic layer deposition process is a composite electrode material in which the metal oxide pseudocapacitor material is deposited onto the porous carbonaceous material or onto a previously deposited first metal oxide layer and chemically bonded thereto. These layers (i.e., the metal oxide pseudocapacitor material and the first metal oxide) typically deposit not only onto exterior surfaces, but also into macropores and, more importantly, meso-pores. Because of this, the applied layers tend to become deposited throughout the three-dimensional structure of the carbonaceous material.

In some cases, the ALD process may tend to form isolated "islands" of deposited first metal oxide through the first reaction cycles. The "islands" can be grown to larger sizes by repeating the reaction cycles, and eventually will merge to form a continuous film. If such islands form, the ALD process may be discontinued before a continuous film is produced, to form a 0.5 to 20 nm, preferably 1 to 20 nm, especially 1 to 10 nm metal oxide particles. However, it is preferred to form a continuous film of the first metal oxide. If particles initially form, a film usually will form by performing more ALD reaction cycles. If the carbonaceous substrate contains enough surface functional groups (or an intermediate functionalizing layer is applied, the first metal oxide tends to deposit in a highly uniform manner and will form a continuous film after the first few reaction cycles.

Similarly, in some cases the metal oxide pseudocapacitor material may at first deposit onto the carbonaceous material or onto the first metal oxide layer in the form of isolated "islands". If so, the ALD process can be repeated until a continuous film forms, or may be discontinued to leave the metal oxide pseudocapacitor material in the form of small particles.

The resulting composite can be formed into an electrode in any convenient manner. If the composite is in the form of a powder, it is conveniently combined with one or more binder materials, optionally a conductive material such as carbon black, and a solvent or dispersant such as water, lower alcohol and the like, to form a slurry which is applied to a current conductor and dried. The composite may be in (or formed into) a mat, fabric, felt or the like which is then affixed to the current collector in any convenient method. The resulting electrode may be subjected to a drying, such as at a temperature of up to 200° C., if desired. The drying step may be performed under vacuum.

It is also possible to assemble the carbonaceous material into the shape of the electrode and then form the composite by depositing the metal oxide(s) via atomic layer deposition. This can be done before or after affixing the carbonaceous material to the current collector.

The composite may be exposed to oxygen (such as, for example, by contact with air or other oxygen-containing gas) before or after being formed into an electrode. Exposure to oxygen may increase the oxidation state at surface of the deposited particles or film of the metal oxide pseudocapacitor material, which may in turn increase the capacitance of the electrode.

The composite electrode has a specific capacitance significantly greater than that of the carbonaceous material by itself. This indicates that the deposited metal oxide pseudocapacitor material is contributing to the capacitance of the composite. The specific capacitance of the composite electrode often exceeds 70 F/g, although this value can range significantly depending on various factors, such as the loading of the metal oxide pseudocapacitor material, the particular metal oxide pseudocapacitor material present, the particle size and/or film thickness, and the particular carbonaceous material used as the substrate.

A particular benefit of the invention is that good specific capacitance values are seen at scan rates up to 150 mV/s or more. The specific capacitance values at high scan rates are good indicators of the performance of the material at the high charge/discharge rates for which they are often adapted. For example, supercapacitors are of interest in vehicular power systems, where because of their high power densities are often used to boost acceleration or provide additional power under temporarily high loads (such as climbing hills). In such applications, the high specific capacitance at high discharge rates seen with this invention can be a significant advantage. Similarly, these vehicular supercapacitors are often used to capture energy from braking; this energy is available intermittently, in large quantities and for short periods. Therefore, high specific capacitance is needed at high charge rates to effectively capture this energy.

The supercapacitor of the invention is useful as energy supply/capture devices in automobiles and other vehicles; and as power supply/storage devices for a wide range of electrical and electronic devices. They are particularly useful in rechargers for rechargeable products such as power tools, cordless phones, cell phones, computers, personal computing devices, portable electronic game players, flashlights, electric shavers and the like.

The following examples are provided to illustrate the invention but not to limit the scope thereof. All parts and percentages are by weight unless otherwise indicated.

EXAMPLES 1-4

Graphite powders (5 g) are added to a mixture of concentrated $H_2SO_4$ (115 mL) and NaNO3 (2.5 g) and stirred in an ice bath. $KMnO_4$ (15 g) is added, and the mixture is stirred for 30 minutes at 35° C. 230 mL of deionized water is added slowly, and the temperature of the mixture is increased to 98° C. for 15 minutes. A mixture of 3 mL 3% hydrogen peroxide and 355 mL deionized water is added. The solid material is recovered from the liquids by centrifugation, and is washed with excess deionized water, 20 vol-% HCl and ethanol. The washing process is repeated three times. The resulting yellow-brown graphene oxide powders are dried under vacuum at 40° C. for 12 hours. 200 mg of the powder is loaded into a crucible in a quartz tube that is sealed on one end. The tube is purged with argon and then sealed with a rubber stopper. The sealed tube is inserted into a preheated 1050° C. oven and held there for 30 seconds to produce an expanded graphene powder.

A sample of the powder is heated at 150° C. under vacuum for 12 hours. The surface area of the treated powder is then measured using a Quantachrome AUTOSORB-1 instrument. The surface area of the graphene is 467 m²/g.

X-ray diffraction is performed on another sample of the graphene powder using a PAN analytical x-ray diffraction system. A small and broad peak at about 24° 2-theta indicates some disordered layer stacking of the exfoliated graphene sheets.

Electrode Example 1 is prepared by depositing $TiO_x$ onto a portion of this graphene material via ALD in a rotary reactor. The gas phase reactants are $TiCl_4$ and water. Each reaction cycle consists of the following steps: i) $TiCl_4$ dose to 1.0 Torr; ii) evacuation of reaction products and excess $TiCl_4$; iii) $H_2O$ dose to 1.0 Torr; and iv) evacuation of reaction products and excess water. Each of these steps is performed at 180° C. Fifty reaction cycles are performed.

Electrode Example 2 is performed in the same manner, except 100 reaction cycles are performed. Transmission electron spectroscopy (TEM) images are obtained on Example 2 using a JEOL JEM-2010 instrument with an operating voltage of 200 kV. Images at two levels of magnification form FIGS. 2 and 2A, respectively.

X-ray diffraction studies of Examples 1 and 2 each exhibit diffraction peaks indexed to crystallized anatase $TiO_x$. This presence of $TiO_x$ is also confirmed by X-ray elemental analysis and x-ray photoelectron spectroscopy (XPS). The XPS spectra includes peaks corresponding to energies of 530.6, 532 and 533.3 eV, which are assigned to a Ti—O, C—O and H—O bonds, respectively, and are indicative of the formation of a covalent chemical bond between the graphene and the $TiO_x$ particles. This chemical bonding may facilitate the fast electron transport throughout the graphene network and between the graphene and the $TiO_x$ particles. The chemical bonding should also enhance the chemical stability of the composite.

Analysis by scanning electron microscopy (SEM) and TEM indicates that the $TiO_x$ particles are distributed on the surface as well as within the macro-pores of the graphene, leading to a three-dimensional distribution of the particles onto the graphene. The ability to distribute the particles within the macro-pores is believed to be unique to ALD methods. The particle size for Example 1 is about 6 nm; that for Example 2 is about 10 nm.

The surface areas of Examples 1 and 2 are measured as described before and found to be 120 m²/g and 48 m²/g, respectively. The reduction in surface area per unit weight is largely attributable to the increase mass of the samples due to the deposition of $TiO_x$. The pore size distributions of Examples 1 and 2 are similar based on volume percentage (the ratio of pore width to total pore volume), which indicates that the $TiO_x$ particles are not blocking the pore structures in a significant way.

Electrodes are prepared from each of the graphene, Example 1 and Example 2 by mixing the active materials, carbon black and polytetrafluoroethane at a ratio of 80:10:10 in the presence of a small amount of ethanol to form a slurry. The mixture is sonicated for 30 minutes and then pasted onto a circular nickel foam (1.6 cm²) current collector. The samples are then dried overnight at 80° C. and compressed at 20 MPa. Various electrodes are made from each of the graphene, Example 1 and Example 2, at various mass loadings.

Figure 3:
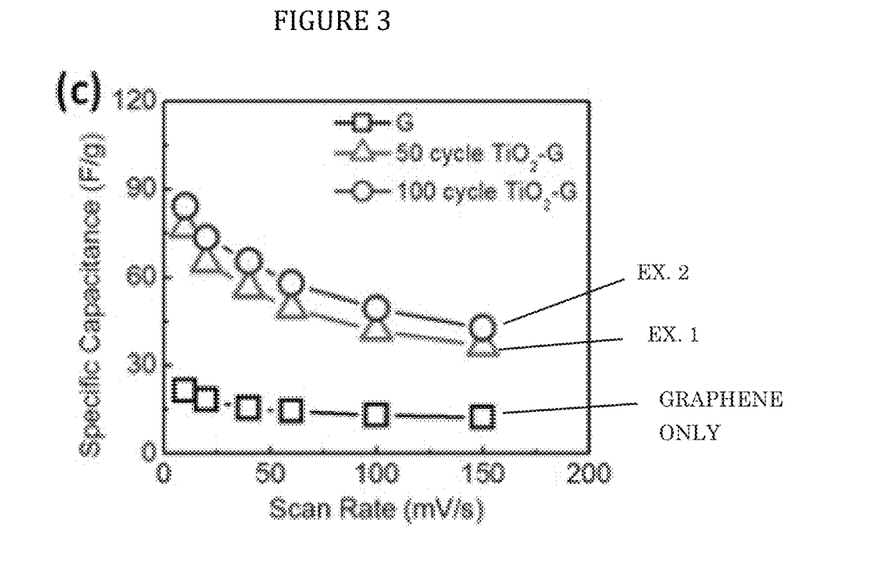
FIG. 3 is a graph showing specific capacitance versus scan rate for composite electrodes of the invention and a comparative electrode.

The electrochemical properties of the electrodes are evaluated by cyclic voltammetry against a saturated calomel electrode in a voltage range of from −0.05 to 0.5 V in a 1M KOH solution, using a VersaSTAT4 potentiostat from Princeton Applied Research. The scan rate is varied from 10 to 150 mV/s. The graphene electrode has a graphene loading of 0.85 mg/cm². The electrodes holding the Examples 1 and 2 materials have $TiO_x$ loadings of 0.7 mg/cm². The specific capacity is calculated; results are shown graphically in FIG. 3. As can be seen in FIG. 3, the specific capacitance of Examples 1 and 2 are each much greater than that of the graphene electrode at every scan rate. Significantly, each of Examples 1 and 2 demonstrates a specific capacitance of about 40 F/g even at a scan rate of 150 mV/s.

Figure 4:
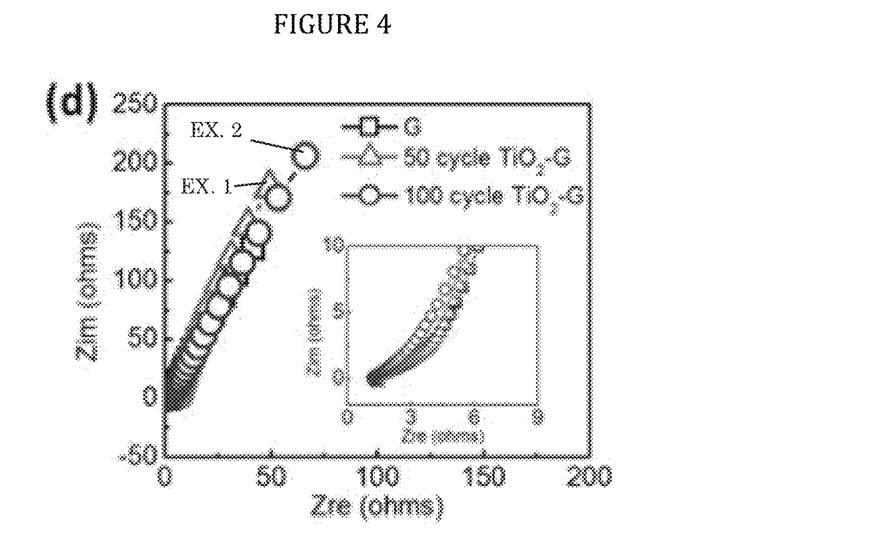
FIG. 4 is a Nyquist plot comparing the two electrodes of the invention with a comparative electrode.

FIG. 4 is a Nyquist plot comparing the graphene electrode with the Example 1 and Example 2 electrodes. In each case, the nearly vertical shape of the curve corresponds to that of an ideal capacitor. The curves for the composite electrodes (Examples 1 and 2) overlap that of graphene, which indicates that the composite electrodes maintain the favorable impedance of graphene.

Two additional electrodes (Examples 3 and 4) are made in the same manner, using the Example 2 composite. The loadings of the Example 2 material on each of the nickel current collectors are 1.56 and 3.22 mg/cm², respectively. The electrochemical performance of each of these electrodes is determined as before. Results are indicated in FIG. 5 (specific capacity as a function of scan rate) and FIG. 6 (Nyquist plot); in each case the results of Example 2 are repeated for comparison.

Figure 5:
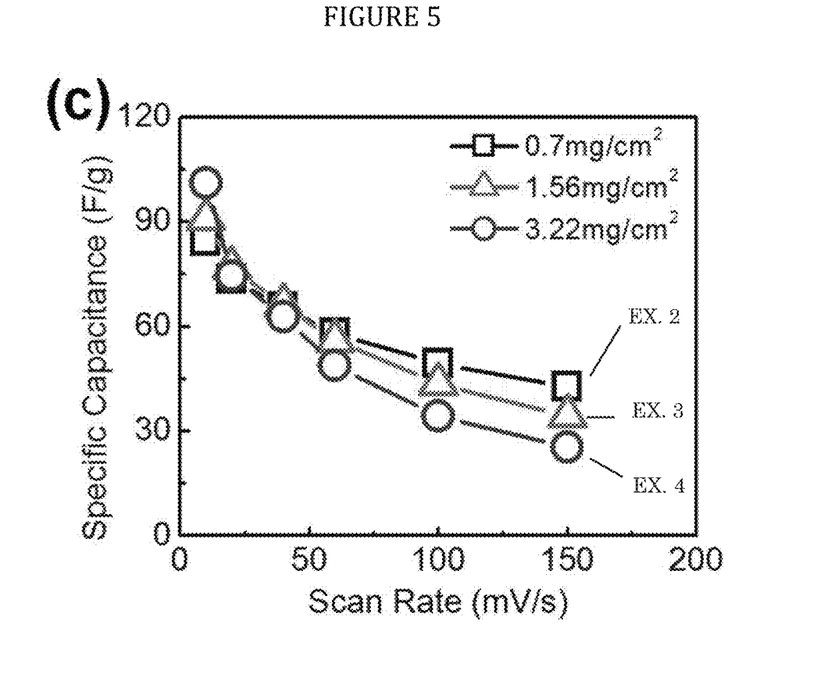
FIG. 5 is a graph showing specific capacitance versus scan rate for composite electrodes of the invention.
Figure 6:
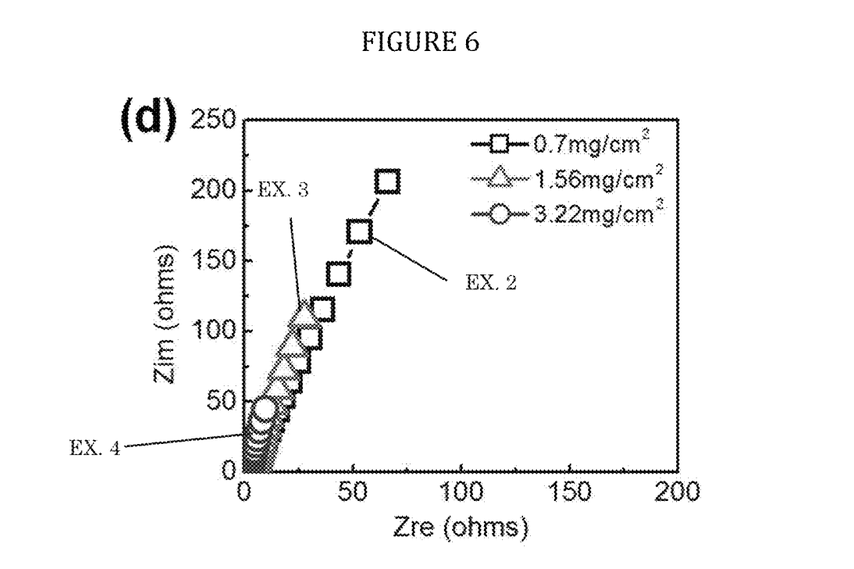
FIG. 6 is a Nyquist plot for composite electrodes of the invention.

As can be seen in FIG. 5, specific capacitance is very similar for all of Examples 2-4 at a scan rate of 10 mV/s. Examples 3 and 4 exhibit slightly lower specific capacitances at higher scan rates. FIG. 6 shows that impedance does not change significantly at the higher $TiO_x$ loading.

Figure 8:
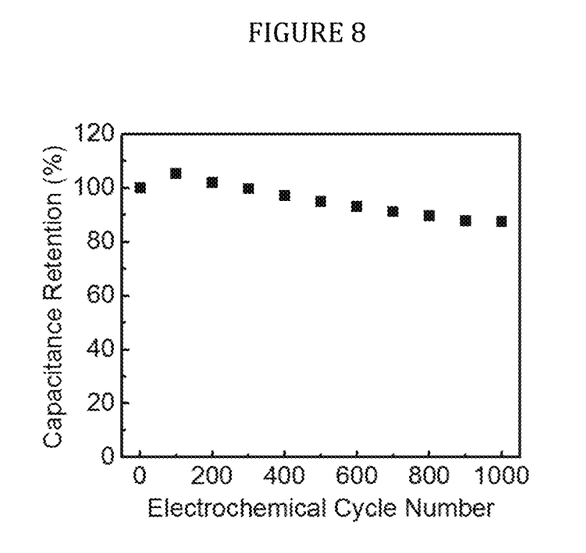
FIG. 8 is a graph showing capacitance retention as a function of electrochemical cycles for an embodiment of the invention.

Electrode Example 2 is cycled through 1000 cycles at 2 A/g to evaluate its ability to retain its capacitance. Results are shown graphically in FIG. 8. As can be seen, this electrode retains 87.5% of its initial capacitance after 1000 cycles. This performance is significantly better than has been reported for other $TiO_x$ composite electrodes.

EXAMPLE 5

To verify growth of manganese oxide on a glassy carbon substrate, a square of glassy carbon (Alfa Aesar) is coated with 100 cycles of $MnO_x$ as described below and examined with X-ray photoelectron spectroscopy (XPS) after various sputtering times. The XPS spectrum clearly shows deposition of a $MnO_x$ layer about 70 Å thick, or a deposition rate of about 0.7 Å/ALD reaction cycle. The layer takes the form of a continuous film rather than discrete particles.

Figure 7:
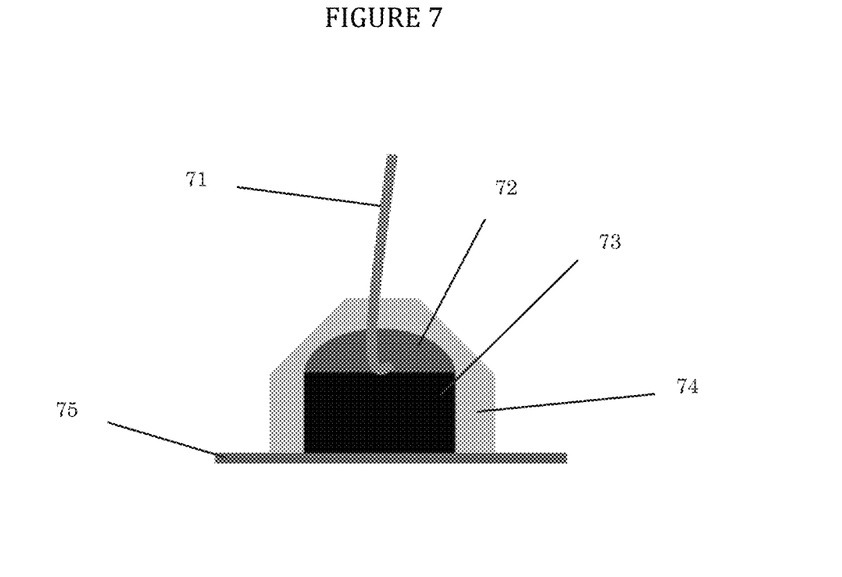
FIG. 7 is a front-view of an embodiment of an electrode of the invention.

Glassy carbon substrates 1 mm in thickness are cut into squares of 0.1±0.01 cm² cross-sectional area. Electrodes as shown in FIG. 7 are made from these glassy carbon squares. The bottom surface of glass carbon substrate square 73 is covered with tape 75. Wire 71 is glued to glassy carbon substrate square 73 with electrically conducting epoxy layer 72, and the assembly is coated on all sides but the bottom with electrically insulating epoxy layer 74. Tape 75 is then removed.

These electrodes are then coated with manganese oxide ($MnO_x$) using atomic layer deposition (ALD) in a viscous flow reactor at 200° C. with bis(ethylcyclopentadienyl)manganese (B(ECP)Mn)) and water precursors. Deposition is carried out in cycles comprised of an a:b:c:d timing sequence of 1:60:1:60 where a is the length of B(ECP)Mn dose, b is the length of nitrogen purge, c is the length of water dose, and d is the length of nitrogen purge, all in seconds. Both the B(ECP)Mn and water doses are approximately 100 mtorr above base pressure. Glassy carbon electrodes with 25, 50, and 100 cycles (Examples 5A, 5B and 5C) of manganese oxide ALD are produced.

A portion of the electrode wires which would be in contact with the electrolyte and all but the bottom face of the electrodes are coated with nail polish and cured. Cyclic voltammetry of the fabricated electrodes was then carried out in a 0.1M $Na_2SO_4$ electrolyte under continuous purge with argon using a platinum counter electrode and an Ag/AgCl reference electrode. The cyclic voltammograms are measured three times in succession at a scan rate of 400 mV/sec for electrodes with 0 (Comparative Sample A), 25, 50, and 100 ALD cycles of $MnO_x$. The capacitance is calculated as a function of unit area and unit mass of $MnO_x$ is calculated. Results are as indicated in Table 1.

TABLE 1

| Designation | ALD Cycles | Estimated $MnO_x$ Thickness (Angstrom) | Capacitance per unit area $F/m^2$ | Capacitance per unit mass $F/gMnOx$ |
|---|---|---|---|---|
| A | 0 | 0 | 2.0 | — |
| 5A | 25 | 17.5 | 2.2 | 241 |
| 5B | 50 | 35 | 4.8 | 263 |
| 5C | 100 | 70 | 1.1 | 30 |

This data suggests that an optimum thickness for an $MnO_x$ film may be between 17 Å and 70 Å.

EXAMPLES 6-9

Electrode Example 6 is prepared by depositing an intermediate $NO_2$/aluminum layer onto a graphene having a surface area of about 467 $m^2$/g via atomic layer deposition in a rotary reactor, using $NO_2$ and trimethylaluminum as the reagents, using the general method described by Cavanagh et al., Nanotechnology 20 (2009) 255609. This intermediate layer is less than 0.5 nm thick. An alumina layer of about 0.5 nm in thickness is then applied via ALD using trimethylaluminum and water as the precursors. A $TiO_x$ film is deposited atop the alumina layer via ALD in a rotary reactor. The gas phase reactants are $TiCl_4$ and water. Each reaction cycle consists of the following steps: i) $TiCl_4$ does to 1.0 Torr; ii) evacuation of reaction products and excess $TiCl_4$; iii) $H_2O$ dose to 1.0 Torr; and iv) evacuation of reaction products and excess water. Each of these steps is performed at 180° C. For Example 6, twenty-five reaction cycles are performed. For Example 7, fifty reaction cycles are performed. The $TiO_x$ film thickness for Example 6 is about 5 nm; that for Example 7 is about 10 nm.

Figure 10:
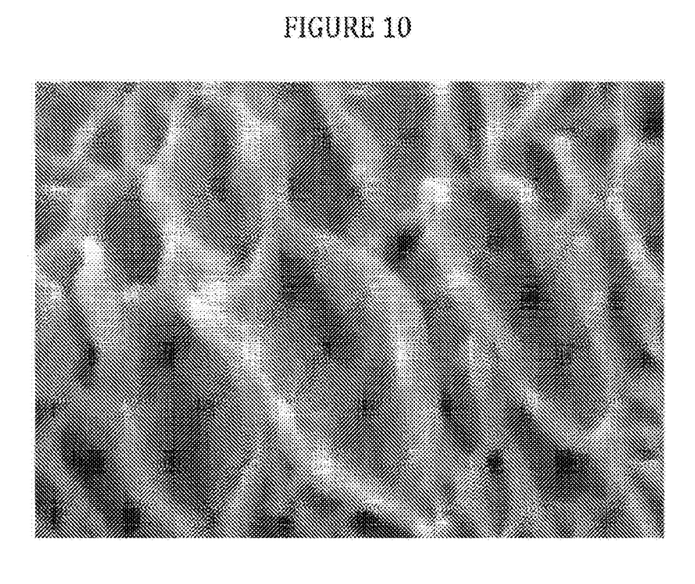
FIG. 10 is a micrograph of a composite electrode in accordance with the invention.

Scanning electron spectroscopy (SEM) images are obtained on Example 7. A SEM image forms FIG. 10. As can be seen in FIG. 10, the SEM images show that a continuous, highly conformal $TiO_x$ film has formed on all exposed surfaces of the graphene, even within the mesopores.

X-ray diffraction studies of Examples 6 and 7 each indicate that the $TiO_x$ has deposited as an amorphous layer. This presence of $TiO_x$ is also confirmed by x-ray photoelectron spectroscopy (XPS).

The surface areas of Examples 6 and 7 are measured as described before and found to be 131.5 $m^2$/g and 91.4 $m^2$/g, respectively. The reduction in surface area per unit weight (relative to the graphene) is largely attributable to the increase in mass of the samples due to the deposition of the alumina and $TiO_x$ layers. The SEM images indicate that the applied films are not blocking the pore structures in a significant way.

Electrodes are prepared from each of the graphene, Example 6 and Example 7 by mixing the active materials, carbon black and polytetrafluoroethylene at a ratio of 80:10:10 in the presence of a small amount of ethanol to form a slurry. The mixture is sonicated for 30 minutes and then pasted onto a circular nickel foam (1.6 $cm^2$) current collector. The samples are then dried overnight at 80° C. and compressed at 20 MPa. Various electrodes are made from each of the graphene, Example 6 and Example 7, at various mass loadings.

Figure 11:
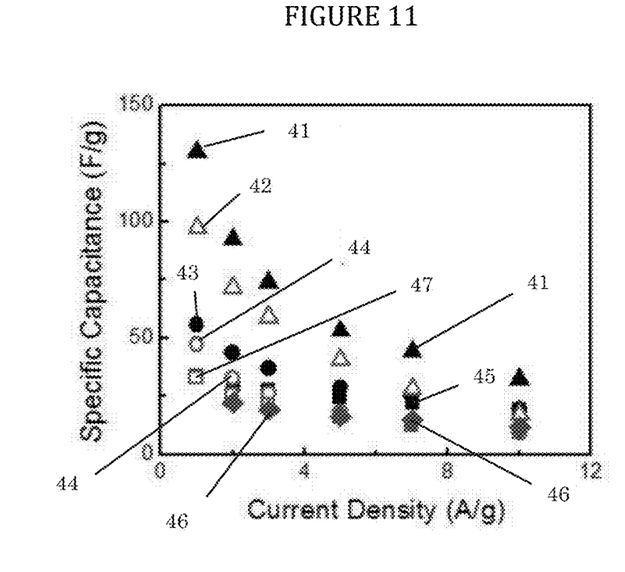
FIG. 11 is a graph showing specific capacitance versus current density for composite electrodes of the invention and several comparative electrodes.

The electrochemical properties of the electrodes are evaluated by Galvanostatic charge/discharge against a saturated calomel electrode in a voltage range of from –0.05 to 0.45 V in a 1M KOH solution, using a VersaSTAT4 potentiostat from Princeton Applied Research. The current density is varied from 1 to 10 A/g. The mass loading of all electrodes are controlled between 1-2 mg/$cm^2$. The specific capacity is calculated; results are shown graphically in FIG. 11. In FIG. 11, open circles 44 indicate the specific capacitance values for Example 6 at the specified current densities; open triangles 42 indicate the specific capacitance values for Example 7 at the same current densities. For comparison, the electrochemical properties of an electrode made from the untreated graphene are measured in the same way. The results are indicated in FIG. 11 by open squares 47. As can be seen in FIG. 11, the specific capacitance of Examples 6 and 7 are each much greater than that of the graphene electrode at every current density. The specific capacitance values for Example 7 are much greater than for Example 6.

8-nm single-wall carbon nanotubes are coated with an intermediately functionalizing layer, an alumina layer and $TiO_x$ in the general manner as described with respect to Examples 6 and 7. Example 8 is formed using 25 $TiO_x$ ALD reaction cycles, and Example 9 is formed using 50 $TiO_x$ ALD reaction cycles. The surface areas of the starting nanotubes, Example 8 and Example 9 are 412, 50 and 29 $m^2$/g, respectively. Three additional electrodes are made in the same manner, using the coated nanotubes and, for comparison, the uncoated nanotubes. The electrochemical performance of each of these electrodes is determined as before. Results are indicated in FIG. 11. In FIG. 11, black squares 45 designate the specific capacitance of the uncoated nanotubes at the indicated current densities, whereas the specific capacitance values for Examples 8 and 9 are indicated by black circles 43 and black triangles 41, respectively. The specific capacitance values of each of Examples 8 and 9 are higher than the control; those of Example 9 are significantly higher than those of Example 8.

As a further comparison, an electrode is made by combining 70 wt % 32 nm $TiO_2$ nanoparticles, 20 wt % carbon black and 10 wt % polytetrafluoroethylene in the general manner described before. Specific capacitance is measured as before, results are indicated by the diamonds 46 in FIG. 11. As can be seen, the inclusion of $TiO_2$ nanoparticles which are not chemically bonded to the graphene leads to a loss of specific capacitance, even when compared to the uncoated graphene.

Figure 12:
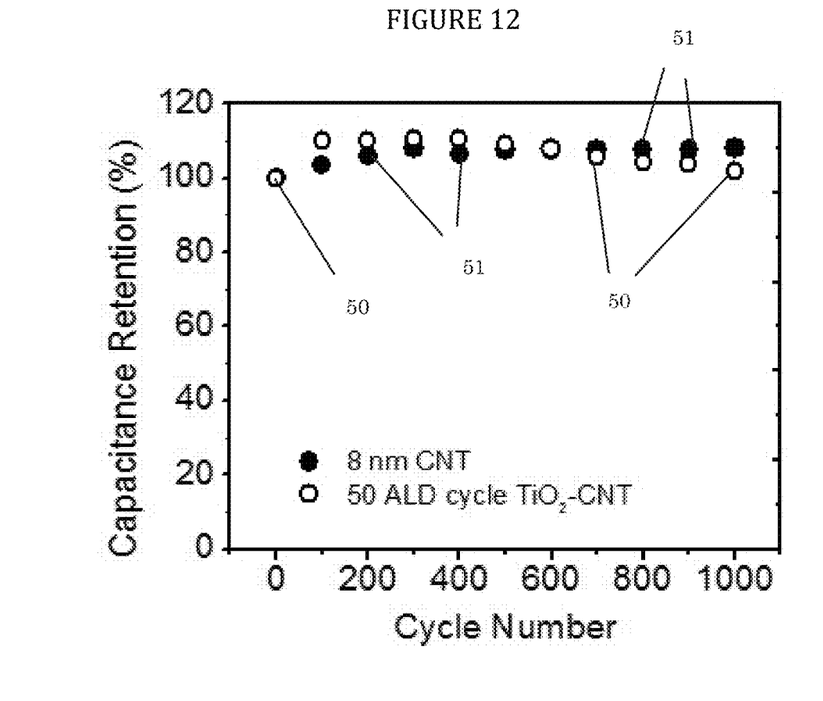
FIG. 12 is a graph showing capacitance retention versus number of cycles for an electrode of the invention and a comparative electrode.

Electrode Example 10 is cycled through 1000 cycles at 2 A/g to evaluate its ability to retain its capacitance. Results are indicated by open circles 50 in FIG. 12. As can be seen, this electrode retains essentially all of its initial capacitance after 1000 cycles. This performance is comparable to that of the uncoated nanotubes (as indicated by black circles 51), although the uncoated nanotubes have a much lower initial specific capacitance.

The invention claimed is:

1. A supercapacitor comprising at least two electrodes, each electrode being in electrical contact with an electrically conductive current collector, said electrodes being spaced apart and having an electrolyte interposed between and in contact with each of said electrodes, wherein at least one of the electrodes is a composite of a porous carbonaceous material having a metal oxide pseudocapacitor material deposited thereon and chemically bonded to the carbonaceous material, the metal oxide pseudocapacitor material being in the form of a continuous, conformal film having a thickness of from 0.5 nm to 25 nm and constituting 25 to 95% of the weight of the composite, and wherein the composite has a surface area of at least 25 $m^2/g$.

2. The supercapacitor of claim 1, wherein the metal oxide pseudocapacitor material in the form of a continuous conformal film comprises at least one mono-layer of the metal oxide pseudocapacitor material.

3. A supercapacitor comprising at least two electrodes, each electrode being in electrical contact with an electrically conductive current collector, said electrodes being spaced apart and having an electrolyte interposed between and in contact with each of said electrodes, wherein at least one of the electrodes is a composite of a porous carbonaceous material having a transition metal oxide or tin oxide deposited thereon and chemically bonded to the carbonaceous material, the transition metal oxide or tin oxide being in the form of a continuous, conformal film having a thickness of from 1 nm to 25 nm and constituting 25 to 95% of the weight of the composite, and wherein the composite has a surface area of at least 25 $m^2/g$.

4. The supercapacitor of claim 3, wherein the transition metal oxide or tin oxide is deposited on the porous carbonaceous material in the form of a continuous, conformal film having a thickness of 2 nm to 12 nm.

5. The supercapacitor of claim 3, wherein the carbonaceous material has a surface area of at least 100 $m^2/g$ prior to deposition of the transition metal oxide or tin oxide.

6. The supercapacitor of claim 3, wherein the carbonaceous material is selected from one or more of activated carbon, carbon black, graphene, mesoporous carbon, carbon fibers, graphite powder, oriented pyrolytic graphite, mesoporous carbon, porous graphite, graphitized carbon, glassy carbon, carbon aerogel, single-wall carbon nanotubes, multi-wall carbon nanotubes.

7. The supercapacitor of claim 3, wherein the carbonaceous material is selected from graphene, single-wall nanotubes and multi-wall carbon nanotubes.

8. The supercapacitor of claim 3, wherein the transition metal oxide or tin oxide is an oxide of vanadium, chromium, molybdenum, titanium, ruthenium, tin, manganese, nickel, cobalt, iron or copper.

9. The supercapacitor of claim 8 wherein the transition metal oxide or tin oxide is of the form $MO_z$, where M denotes transition metal having a valence state y and Z is $\geq y/2$.

10. The supercapacitor of claim 1 or 3 wherein the electrolyte is an aqueous electrolyte solution, an organic electrolyte solution or an ionic liquid.

11. A supercapacitor comprising at least two electrodes, each electrode being in electrical contact with an electrically conductive current collector, said electrodes being spaced apart and having an electrolyte interposed between and in contact with each of said electrodes, wherein at least one of the electrodes is a composite of a porous carbonaceous material having a 0.1 nm to 20 nm continuous, conformal film of a first metal oxide deposited thereon ante and chemically bonded to the carbonaceous material directly or through an intermediate functionalizing layer, and a metal oxide pseudocapacitor material different than the first metal oxide and deposited onto the continuous, conformal film of the first metal oxide and chemically bonded thereto, the metal oxide pseudocapacitor material being in the form of a continuous, conformal film having a thickness of 0.5 nm to 25 nm and constituting 25 to 95% of the weight of the composite, and wherein the composite has a surface area of at least 25 $m^2/g$.

12. A supercapacitor comprising at least two electrodes, each electrode being in electrical contact with an electrically conductive current collector, said electrodes being spaced apart and having an electrolyte interposed between and in contact with each of said electrodes, wherein at least one of the electrodes is a composite of a porous carbonaceous material having a 0.1 nm to 20 nm continuous, conformal film of a Group 2, 3, 12, 13, 14 or 15 metal oxide deposited onto and chemically bonded to the carbonaceous material directly or through an intermediate functionalizing layer, and a transition metal oxide or tin oxide deposited onto the continuous, conformal film of the group 2, 3, 12, 13, 14 or 15 metal oxide and chemically bonded thereto, the transition metal oxide or tin oxide being in the form of a continuous, conformal film having a thickness of from 1 nm to 25 nm and constituting from 25 to 95% of the weight of the composite, and wherein the composite has a surface area of at least 25 $m^2/g$.

13. The supercapacitor of claim 12, wherein the transition metal oxide or tin oxide continuous, conformal film 'deposited on the continuous, conformal film of the Group 2, 3, 12, 13, 14 or 15 metal oxide has a thickness of from 2 nm to 20 nm.

14. The supercapacitor of claim 12, wherein the transition metal oxide or tin oxide continuous, conformal film deposited on the continuous, conformal film of the Group 2, 3, 12, 13, 14 or 15 metal oxide has a thickness of from 2 nm to 12 nm.

15. The supercapacitor of claim 12, wherein the continuous, conformal film of the Group 2, 3, 12, 13, 14 or 15 metal oxide deposited on the porous carbonaceous material has a thickness of 0.5 nm to 5 nm.

16. The supercapacitor of claim 12, wherein an intermediate functionalizing layer is interposed between the carbonaceous material and the continuous, conformal film of the Group 2, 3, 12, 13, 14 or 15 metal oxide.

17. The supercapacitor of claim 12, wherein the carbonaceous material is selected from one or more of activated carbon, carbon black, graphene, mesoporous carbon, carbon fibers, graphite powder, oriented pyrolytic graphite, porous graphite, graphitized carbon, glassy carbon, carbon aerogel, single-wall carbon nanotubes, multi-wall carbon nanotubes.

18. The supercapacitor of claim 17, wherein the carbonaceous material is selected from graphene, single-wall nanotubes and multi-wall carbon nanotubes.

19. The supercapacitor of claim 12, wherein the transition metal oxide or tin oxide is an oxide of vanadium, chromium, molybdenum, titanium, ruthenium, tin, manganese, nickel, cobalt, iron or copper.

20. The supercapacitor of claim 18 wherein the transition metal oxide or tin oxide is of the form $MO_z$, where M denotes transition metal having a valence state y and Z is $\geq y/2$.

21. The supercapacitor of claim 12 wherein the electrolyte is an aqueous electrolyte solution, an organic electrolyte solution, or an ionic liquid.

22. The supercapacitor of claim 12 wherein the Group 2, 3, 12, 13, 14 or 15 metal oxide is aluminum oxide.

* * * * *